United States Patent
Dey, IV

(10) Patent No.: US 10,406,672 B2
(45) Date of Patent: Sep. 10, 2019

(54) HOLDING FORCE DETECTION FOR MAGNETIC DRILL PRESS

(71) Applicant: Milwaukee Electric Tool Corporation, Brookfield, WI (US)

(72) Inventor: John Stanley Dey, IV, Milwaukee, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 0 days.

(21) Appl. No.: 15/420,485

(22) Filed: Jan. 31, 2017

(65) Prior Publication Data

US 2017/0217010 A1    Aug. 3, 2017

Related U.S. Application Data

(60) Provisional application No. 62/289,417, filed on Feb. 1, 2016.

(51) Int. Cl.
| | | |
|---|---|---|
| *B23B 45/14* | (2006.01) | |
| *B25H 1/00* | (2006.01) | |
| *B23B 45/00* | (2006.01) | |

(52) U.S. Cl.
CPC ............ *B25H 1/0071* (2013.01); *B23B 45/00* (2013.01)

(58) Field of Classification Search
CPC ................................ B23B 45/00; B23B 47/00
See application file for complete search history.

(56) References Cited

U.S. PATENT DOCUMENTS

| | | | |
|---|---|---|---|
| 4,278,371 A | 7/1981 | Meyer | |
| 5,096,339 A | 3/1992 | Shoji | |
| 5,284,325 A | 2/1994 | Sasaki et al. | |
| 5,300,883 A | 4/1994 | Richeson | |
| 5,361,615 A | 11/1994 | Kirii et al. | |
| 5,581,179 A * | 12/1996 | Engel ..................... | G01D 5/147 174/556 |
| 6,072,675 A | 6/2000 | Murakami et al. | |
| 6,636,153 B1 | 10/2003 | Barton et al. | |
| 6,853,187 B2 | 2/2005 | Fainchtein | |
| 6,874,980 B1 | 4/2005 | Noelle et al. | |

(Continued)

FOREIGN PATENT DOCUMENTS

| | | |
|---|---|---|
| EP | 0157790 | 10/1985 |
| EP | 2020394 | 2/2009 |

(Continued)

OTHER PUBLICATIONS

International Search Report and Written Opinion for Application No. PCT/US2017/015770 dated Apr. 21, 2017 (13 pages).

*Primary Examiner* — Sunil K Singh
*Assistant Examiner* — Paul M Janeski
(74) *Attorney, Agent, or Firm* — Michael Best & Friedrich LLP

(57) ABSTRACT

A drill press includes a main housing, a base coupled to the main housing, and a drill unit supported by the main housing for relative movement therewith. The base includes a bore formed in a top surface and a magnet to create a magnetic field for magnetically latching the base to a workpiece. The drill press further includes a holding force detection assembly having a plug and a sensor coupled to the plug to detect the magnetic field within the base. The holding force detection assembly is received within the bore formed in the top surface of the base.

4 Claims, 4 Drawing Sheets

(56) References Cited

U.S. PATENT DOCUMENTS

| | | |
|---|---|---|
| 7,570,047 B2 | 8/2009 | Stuve et al. |
| 7,677,844 B2 | 3/2010 | Schell et al. |
| 7,717,191 B2 | 5/2010 | Trautner |
| 7,717,192 B2 | 5/2010 | Schroeder et al. |
| 7,735,575 B2 | 6/2010 | Trautner |
| 7,762,349 B2 | 7/2010 | Trautner et al. |
| 7,770,660 B2 | 8/2010 | Schroeder et al. |
| 7,784,405 B2 | 8/2010 | Rose et al. |
| 7,798,245 B2 | 9/2010 | Trautner |
| 7,854,274 B2 | 12/2010 | Trautner et al. |
| 7,936,142 B2 | 5/2011 | Otsuka et al. |
| 7,987,920 B2 | 8/2011 | Schroeder et al. |
| 8,109,343 B2 | 2/2012 | Schroeder et al. |
| 8,164,333 B2 | 4/2012 | Rugar et al. |
| 8,166,818 B2 | 5/2012 | Dwyer et al. |
| 8,292,001 B2 | 10/2012 | Trautner |
| 8,376,667 B2 | 2/2013 | Wilbert et al. |
| 8,378,836 B2 | 2/2013 | Kopp et al. |
| 8,453,976 B2 | 6/2013 | Lauterberg |
| 8,545,139 B2 | 10/2013 | Beichter et al. |
| 8,568,066 B2 | 10/2013 | Beichter |
| 2003/0222649 A1 | 12/2003 | Fainchtein |
| 2006/0174713 A1 | 8/2006 | Lin et al. |
| 2008/0053188 A1 | 3/2008 | Itoh |
| 2009/0013794 A1 | 1/2009 | Garshelis et al. |
| 2010/0242601 A1 | 9/2010 | Dwyer et al. |
| 2010/0021249 A1 | 10/2010 | Beichter |
| 2010/0295546 A1 | 11/2010 | Walther et al. |
| 2011/0084165 A1 | 4/2011 | Ulbrich-Gasparevic et al. |
| 2011/0304325 A1 | 12/2011 | Walther et al. |
| 2011/0308330 A1 | 12/2011 | May |
| 2013/0108385 A1 | 5/2013 | Woelders |
| 2013/0141090 A1 | 6/2013 | Sidman |

FOREIGN PATENT DOCUMENTS

| | | |
|---|---|---|
| EP | 2072443 | 6/2009 |
| EP | 2397829 | 12/2011 |
| WO | 03009972 | 2/2003 |
| WO | 2007053519 | 5/2007 |
| WO | 2010040997 | 4/2010 |

* cited by examiner

HOLDING FORCE DETECTION FOR MAGNETIC DRILL PRESS

CROSS-REFERENCE TO RELATED APPLICATIONS

This application claims priority to U.S. Provisional Patent Application No. 62/289,417, filed on Feb. 1, 2016, the entire contents of which are incorporated herein by reference.

FIELD OF THE INVENTION

The present invention relates to power tools, and more particularly to drill presses.

BACKGROUND OF THE INVENTION

Portable magnetic drill presses are typically used to drill holes in a workpiece to which the drill press is magnetically latched. Magnetic drill presses use magnets (i.e., permanent magnets or electromagnets) to magnetically latch the drill press to the workpiece. The surface of the workpiece may have a variety of characteristics (e.g., rust, metal shavings, dust, holes in the material, etc.) that could reduce the holding force otherwise capable of being developed by the drill press and the workpiece.

SUMMARY OF THE INVENTION

The invention provides, in one aspect, a drill press including a main housing, a base coupled to the main housing, and a drill unit supported by the main housing for relative movement therewith. The base includes a bore formed in a top surface and a magnet to create a magnetic field for magnetically latching the base to a workpiece. The drill press further includes a holding force detection assembly having a plug and a sensor coupled to the plug to detect the magnetic field within the base. The holding force detection assembly is received within the bore formed in the top surface of the base.

The invention provides, in another aspect, a drill press including a main housing, a base coupled to the main housing, and a drill unit supported by the main housing for relative movement therewith. The base includes a magnet to create a magnetic field for magnetically latching the base to a workpiece. The drill press further includes a holding force detection assembly having a sensor coupled to the main housing and spaced from the base to detect the magnetic field outside the base.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
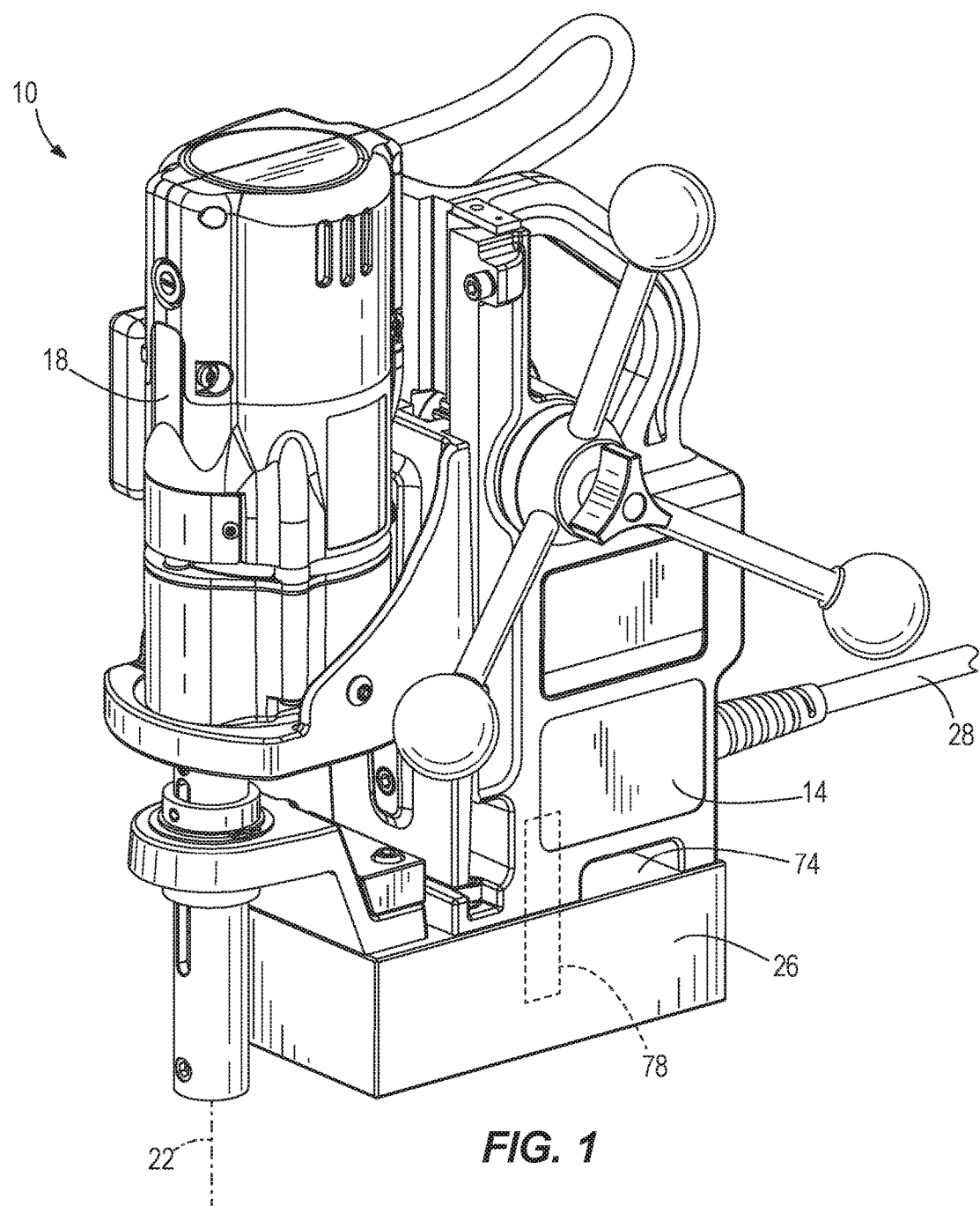
FIG. 1 is a perspective view of a magnetic drill press in accordance with an embodiment of the invention.

FIG. 1 illustrates a magnetic drill press 10 including a main housing 14 and a drill unit 18 that is supported by and movable relative to the main housing 14, along a drilling axis 22, for drilling holes into a workpiece. The drill press 10 also includes a base 26 coupled to the main housing 14 (e.g., using fasteners) for supporting the main housing 14 and the drill unit 18 on the workpiece. In the illustrated embodiment of the drill press 10, the base 26 includes one or more electromagnets therein for magnetically latching the base 26 to a ferromagnetic workpiece. In alternative embodiments, the base includes one or more permanent magnets therein for magnetically latching the base to a ferromagnetic workpiece. In other words, the base includes one or more magnets (i.e., electromagnets or permanent magnets) for magnetically latching the base to a ferromagnetic workpiece. In the illustrated embodiment, the drill press 10 includes a power cord 28 for electrical connection to an AC power source (e.g., AC electrical outlet). Alternatively, the drill press 10 may include an on-board power source (e.g., a battery) for powering the drill unit 18 and the one or more electromagnets in the base 26. A main power switch (not shown) is wired in series between the one or more electromagnets and the power source to selectively energize the electromagnet(s).

Figure 2:
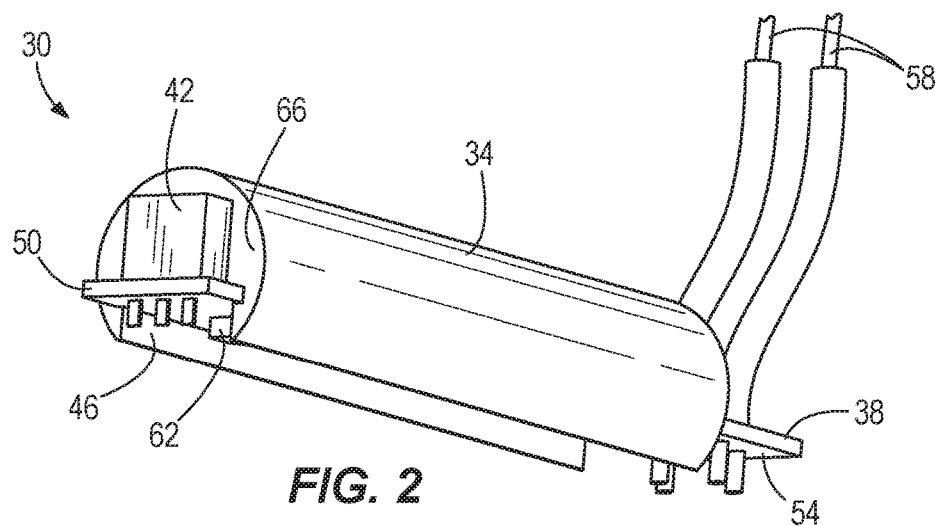
FIG. 2 is a perspective view of a holding force detection assembly for the magnetic drill press of FIG. 1.
Figure 3:
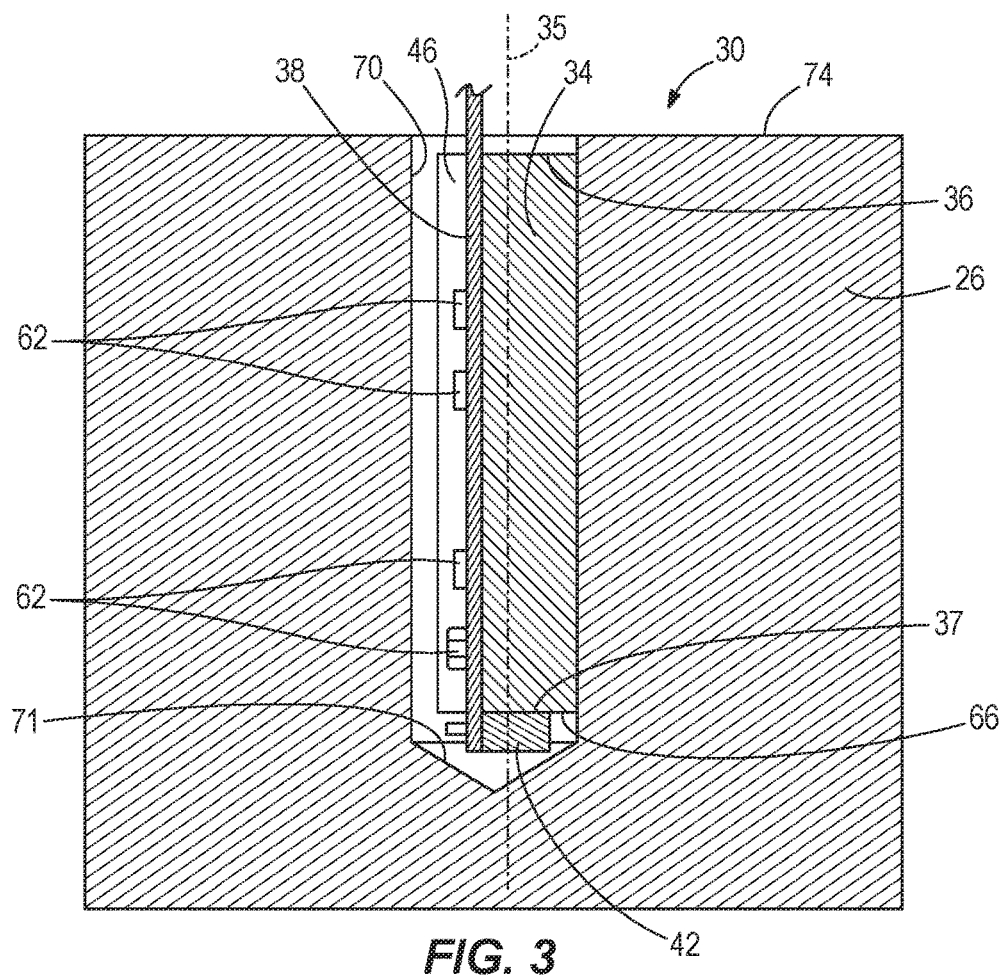
FIG. 3 is a cross-sectional view of the holding force detection assembly of FIG. 2 positioned within a base of the magnetic drill press of FIG. 1.

With reference to FIGS. 2 and 3, the drill press 10 further includes a holding force detection assembly 30 for measuring the strength of the magnetic field permeating the base 26, which can be used to interpolate the holding force between the drill press 10 and the workpiece. In particular, the holding force detection assembly 30 includes a plug 34, a printed circuit board 38, and at least one Hall-effect sensor 42. Specifically, the Hall-effect sensor 42 emits a variable output voltage signal in response to the magnetic field (i.e., magnetic flux density, B, measured in Tesla) in which the Hall-effect sensor 42 is positioned. The stronger the magnetic field measured within the base 26, the stronger the holding force present between the base 26 and the workpiece. In other words, the electromagnet, the base 26, and the workpiece create a magnetic circuit. And, changes in the magnetic field within the base 26 are correlated to the magnitude of the holding force developed. In addition to measuring the strength of the holding force, the Hall-effect sensor 42 can also detect whether or not the base 26 is attached to a workpiece.

With continued reference to FIG. 2, the plug 34 is a steel slug in the illustrated embodiment, with a slot 46 formed along the length of the plug 34. In alternative embodiments, the plug 34 may be any type of ferromagnetic material. The printed circuit board 38 is at least partially received within the slot 46 formed in the plug 34. The printed circuit board 38 includes a first end 50 and a second end 54, opposite the first end 50. The Hall-effect sensor 42 is coupled to the printed circuit board 38 at the first end 50, and the wires 58 are coupled to the second end 54 of the printed circuit board 38. The printed circuit board 38 further includes additional electrical circuit components 62 (e.g., resisters, capacitors, diodes, transistors, etc.) coupled to the printed circuit board 38 and positioned within the slot 46 of the plug 34. The plug 34 defines a plug axis 35 that extends between a first end 36 and a second, opposite end 37 of the plug 34. With reference to FIGS. 1 and 3, the plug axis 35 is parallel to the drilling axis 22 of the drill unit 18.

The plug 34 is ferromagnetic in order to direct the magnetic field through the plug 34, and the Hall-effect sensor 42 is positioned directly beneath the plug 34 such that the magnetic field passes through the Hall-effect sensor 42 to ensure an accurate measurement is achieved. In particular, the Hall-effect sensor 42 is mounted immediately below a flat surface 66 at the second end 37 of the plug 34 to minimize or otherwise eliminate any air gap between the Hall-effect sensor 42 and the plug 34.

With reference to FIG. 3, the holding force detection assembly 30 is at least partially received within a bore 70 formed within the base 26. In the illustrated embodiment, the holding force detection assembly 30 is entirely received within the bore 70. The bore 70 is formed in an upper-most (i.e., top) surface 74 of the base 26. The wires 58 (FIG. 2) extend from the holding force detection assembly 30 to a processing control unit provided in the drill press main housing 14. In particular, the wires 58 extend from the printed circuit board 38, through the top opening of the bore 70, and toward the main housing 14 for connection to the processing control unit. In other words, the first end 50 of the printed circuit board 38 is proximate a bottom 71 of the bore 70, and the wires 58 extend from the second end 54 of the printed circuit board 38 to the control unit. The wires 58 provide electric power to the holding force detection assembly 30 and also transport an output signal from the Hall-effect sensor 42. With the bore 70 formed in the top surface 74 of the base 26, the holding force detection assembly 30 can be encased within the base 26 and the main housing 14 without any externally exposed components and without any complex routing of wires.

In operation of the drill press 10, the drill press 10 may be placed and supported upon a workpiece. The user can align the drilling axis 22 with a desired hole location on the workpiece. Then, the main power switch can be actuated to electrically connect the power source with the electromagnets, thereby energizing the electromagnets. Once energized, the electromagnets magnetically latch the base 26 to the ferromagnetic workpiece to stabilize the drill press 10. Concurrently with energization of the electromagnets, the holding force detection assembly 30 measures the strength of the magnetic field within the base 26. In particular, the magnetic field created by the electromagnets passes through the base 26, the metal plug 34, and the Hall-effect sensor 42 where the measured magnetic field results in an output voltage signal from the Hall-effect sensor 42. The output voltage signal from the Hall-effect sensor 42 is then processed by the processing control unit to calculate the holding force present between the base 26 and the workpiece. If there is not sufficient holding force present between the base 26 and the workpiece, the user is notified of the low holding force and the motor in the drill unit 18 remains deactivated and is not allowed to start. If there is sufficient holding force present, the motor in the drill unit 18 is allowed to activate, permitting the user to drill the hole with the drill unit 18.

Should the holding force (which again is interpolated from the strength of the magnetic field measured by the holding force detection assembly 30) drop below a pre-determined threshold during operation, the drill unit 18 is deactivated. In other words, the drill unit 18 is deactivated in response to detection of a holding force below a predetermined threshold.

In some embodiments, the strength of the holding force determined by the Hall-effect sensor 42 and the processing control unit can be indicated to the user through the use of at least one indicator, such as a visual indicator (e.g., at least one LED) or an audible indicator (e.g., a sound buzzer or alarm, etc.). For example, four LEDs can be utilized to indicate the strength of the holding force to a user, with all four LEDs being illuminated to indicate an optimum or strong holding force and none of the LEDs being illuminated to indicate a weak or nonexistent holding force. Alternatively, a single multi-colored LED can indicated to a user the strength of the holding force using different colors (e.g., green equals a strong holding force, yellow equals an average holding force, and red equals a weak holding force). In further alternatives, a single LED is illuminated only when the holding force falls below a predetermined threshold.

In further alternative embodiments, more than one Hall-effect sensor 42 and/or more than one holding force detection assembly 30 can be positioned within the base 26. With more than one holding force detection assembly 30 utilized, an average can be calculated to provide a more accurate representation of the holding forced developed between the base 26 and the workpiece. In particular, with measurements from more than one Hall-effect sensor, localized variations in the workpiece surface (e.g., rust) can be accounted for by virtue of multiple measurements in multiple locations. In further alternative embodiments, the Hall-effect sensor 42 is replaced with any suitable sensor for the measurement of a changing magnetic field within the base 26.

In further alternative embodiments, the holding force detection assembly 30 can work in conjunction with a lift-off detection system 78 that detects when the base 26 has lifted off and away (i.e., becomes separated) from the workpiece. Once lift-off is detected, the holding force is lost and the drill unit 18 is deactivated.

Figure 4:
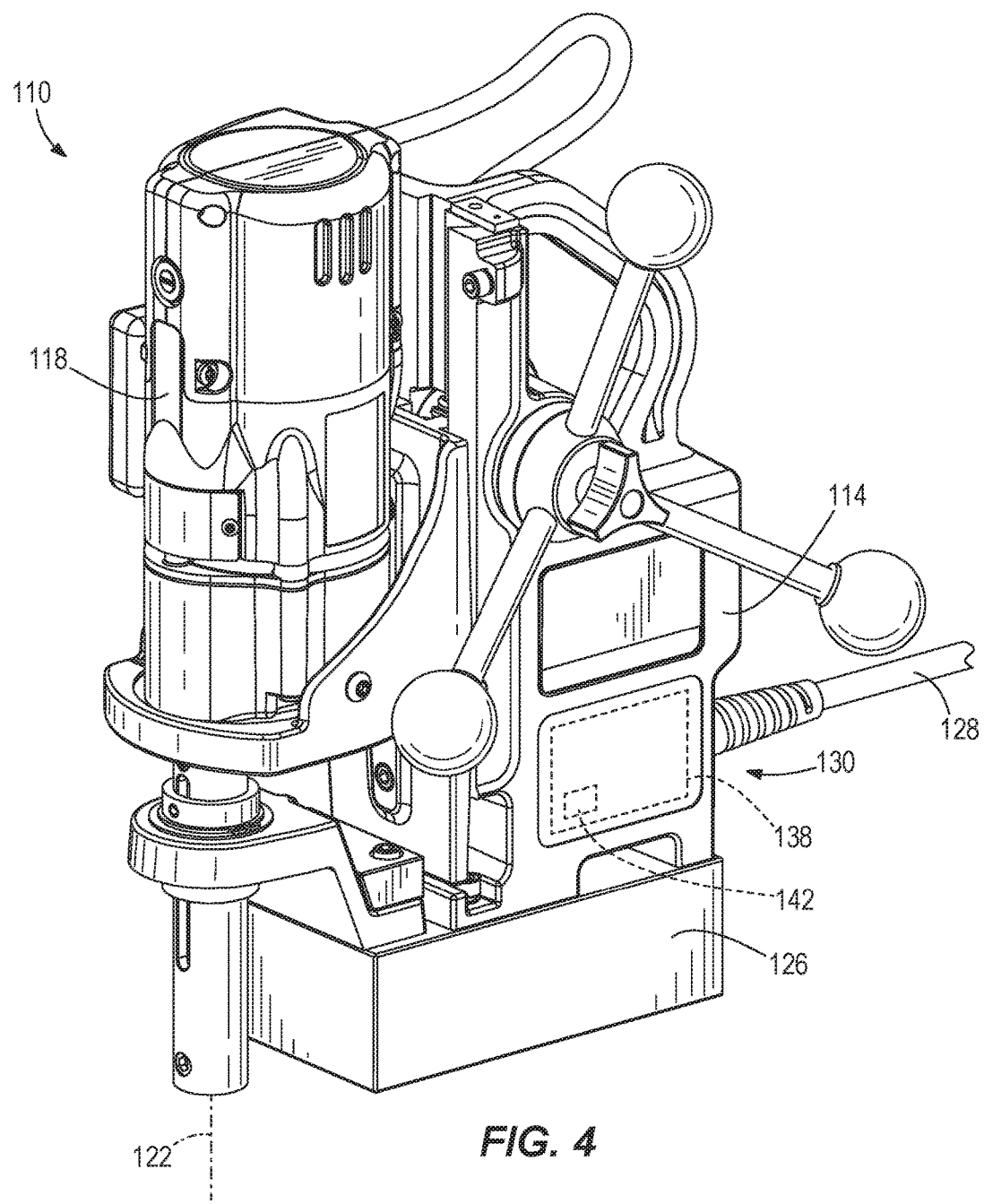
FIG. 4 is a perspective view of a magnetic drill press in accordance with another embodiment of the invention.
Figure 5A:
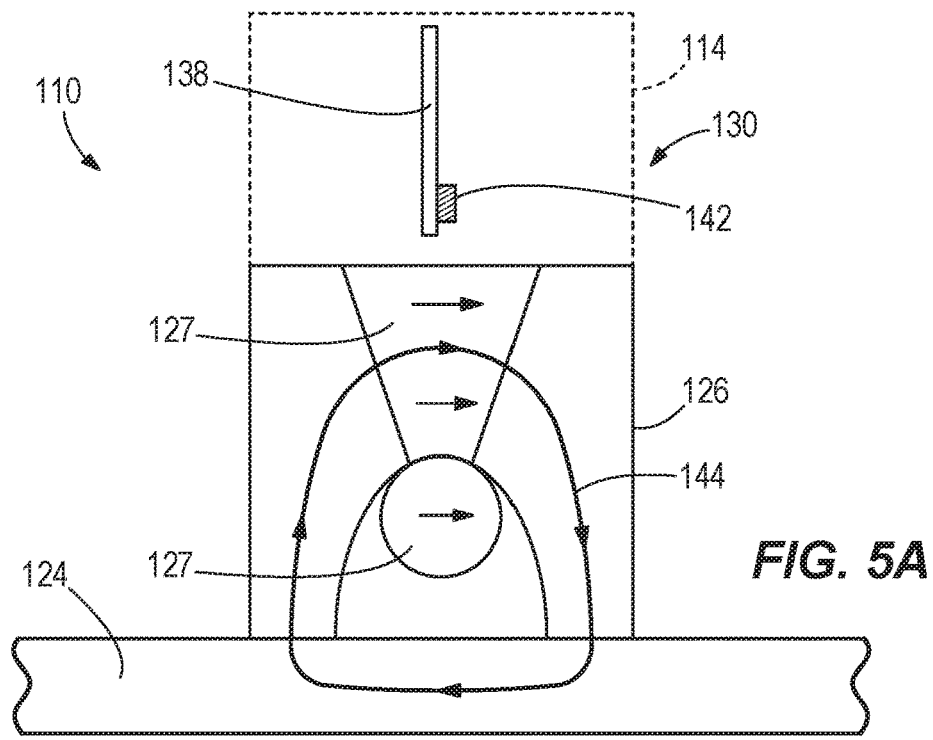
FIG. 5A is a schematic cross-sectional view of a holding force detection assembly for the magnetic drill press of FIG. 4, with a strong holding force present and no magnetic leakage.
Figure 5B:
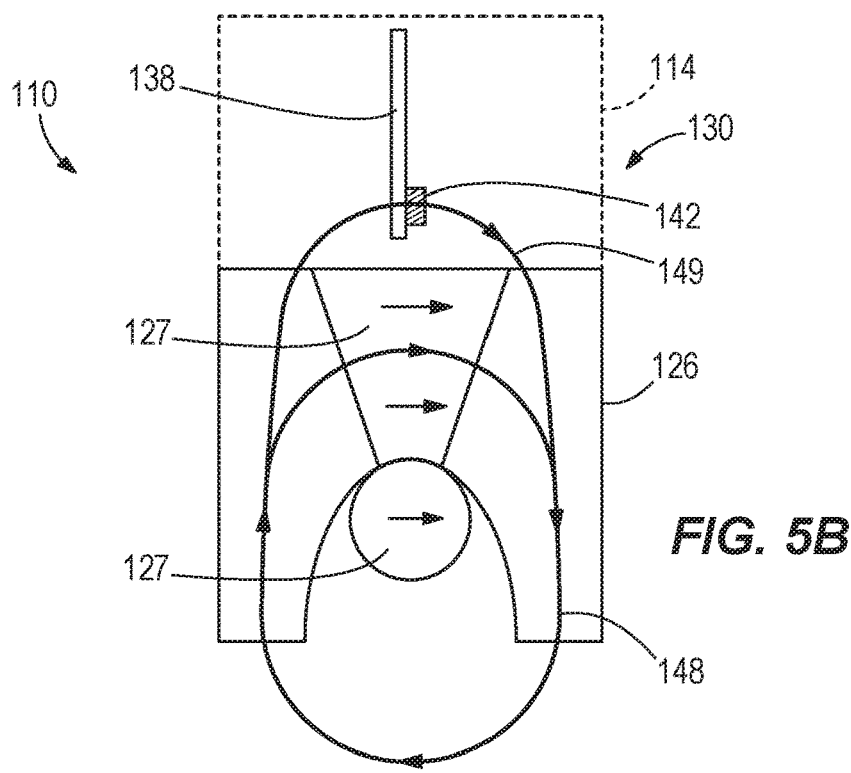
FIG. 5B is a schematic cross-sectional view of the holding force detection assembly for the magnetic drill press of FIG. 4, with no holding force present and detectable magnetic leakage.

With reference to FIGS. 4-5B, a magnetic drill press 110 according to another embodiment of the invention is illustrated. The magnetic drill press 110 includes a main housing 114 and a drill unit 118 that is movable relative to the main housing 114 along a drilling axis 122 for drilling holes into a workpiece 124 (FIG. 5A). The drill press 110 also includes a base 126 coupled to the main housing 114 (e.g., using fasteners) for supporting the main housing 114 and the drill unit 118 on the workpiece 124. In the illustrated embodiment of the drill press 110, the base 126 includes one or more magnets 127 therein for magnetically latching the base 126 to a ferromagnetic workpiece. In alternative embodiments, the base includes one or more electromagnets therein for magnetically latching the base to a ferromagnetic workpiece. In other words, the base includes one or more magnets (i.e., electromagnets or permanent magnets) for magnetically latching the base to a ferromagnetic workpiece. In the illustrated embodiment, the drill press 110 includes a power cord 128 for electrical connection to an AC power source (e.g., AC electrical outlet). Alternatively, the drill press 110 may include an on-board power source (e.g., a battery) for powering the drill unit 118.

With continued reference to FIGS. 4-5B, the drill press 110 further includes a holding force detection assembly 130 for measuring the strength of the magnetic field permeating from the base 126, which can be used to interpolate the holding force between the drill press 110 and the workpiece 124. In particular, the holding force detection assembly 130 includes a printed circuit board 138 and at least one Hall-effect sensor 142. Specifically, the Hall-effect sensor 142 emits a variable output voltage signal in response to the magnetic field (i.e., magnetic flux density, B, measured in Tesla) in which the Hall-effect sensor 142 is positioned. In contrast to the holding force detection assembly 30 of FIGS. 1-3, the holding force detection assembly 130 of FIGS. 4-5B is positioned outside the base 126 and within the main housing 114. In other words, the holding force detection assembly 130 is encased by the main housing 114. More specifically, the printed circuit board 138 is positioned within the main housing 114 and the Hall-effect sensor 142 is coupled to the printed circuit board 138. In the illustrated embodiment, the printed circuit board 138 is a main control board for the drill press 110. By spacing the holding force detection assembly 30 away from the base 126, the Hall-effect sensor 142 is configured to detect the magnetic field that is leaving (i.e., leaking) from the base 126. In other words, the sensor 142 detects the magnetic field leakage. The stronger the magnetic field measured outside (e.g., above) the base 26, the weaker the holding force is present between the base 126 and the workpiece 124. In other words, the larger the magnetic flux leakage, the weaker the holding force is present between the base 126 and the workpiece 124. Said another way, the magnetic field leakage detected by the sensor 142 is inversely correlated to the holding force between the base 126 and the workpiece 124.

With reference to FIG. 5A, the magnets 127, the base 126, and the workpiece 124 create a magnetic circuit 144. In the configuration shown in FIG. 5A, a strong holding force is present between the base 126 and the workpiece 124 since the majority of the magnetic field created by the magnets 127 stays within the base 126 and passes through the workpiece 124. As a result, when there is a strong holding force there is little or no magnetic field leakage detected by the Hall-effect sensor 142. With reference to FIG. 5B, the workpiece 124 is no longer positioned underneath the base 126 so there is no holding force present. In this case, the magnets 127, the base 126, and the surroundings (e.g., air) create a magnetic circuit 148 that includes a magnetic leakage path 149 that extends beyond the base 126 and into the main housing 114, passing through the holding force detection assembly 130 in the main housing 114. The magnetic field along the leakage path 149 is detected by the Hall-effect sensor 142, which creates a signal that is processed by a control unit, which in turn determines that there is no holding force present due to the large amount of magnetic flux leakage detected. In other words, changes in the magnetic field leakage outside the base 126 are inversely correlated to the magnitude of the holding force developed.

Various features of the invention are set forth in the following claims.

What is claimed is:

1. A drill press comprising:
 a main housing;
 a drill unit supported by the main housing for relative movement therewith;
 a base coupled to the main housing, the base includes a magnet to create a magnetic field for magnetically latching the base to a workpiece; and
 a holding force detection assembly including a sensor, wherein the sensor is coupled to the main housing and spaced from the base to detect the magnetic field outside the base.

2. The drill press of claim 1, wherein the magnetic field detected by the sensor is used to determine a holding force between the base and the workpiece.

3. The drill press of claim 2, wherein the magnetic field leakage detected by the sensor is inversely correlated to the holding force between the base and the workpiece.

4. The drill press of claim 1, wherein the holding force detection assembly is encased by the main housing.

* * * * *